United States Patent
Huang et al.

(10) Patent No.: US 11,531,330 B2
(45) Date of Patent: Dec. 20, 2022

(54) BLOCKCHAIN-BASED FAILSAFE MECHANISMS FOR AUTONOMOUS SYSTEMS

(71) Applicant: Eternal Paradise Limited, Mahe (SC)

(72) Inventors: Ian Yuan Yuan Huang, Hong Kong (HK); Geoffrey Lap Fai Yuen, Hong Kong (HK)

(73) Assignee: Eternal Paradise Limited, Mahe (SC)

( * ) Notice: Subject to any disclaimer, the term of this patent is extended or adjusted under 35 U.S.C. 154(b) by 372 days.

(21) Appl. No.: 16/986,145

(22) Filed: Aug. 5, 2020

(65) Prior Publication Data

US 2022/0043441 A1 Feb. 10, 2022

(51) Int. Cl.
| | | |
|---|---|---|
| *G06F 17/00* | (2019.01) | |
| *G05B 23/02* | (2006.01) | |
| *G05D 1/00* | (2006.01) | |
| *G06N 20/00* | (2019.01) | |
| *H04L 9/06* | (2006.01) | |

(52) U.S. Cl.
CPC ....... *G05B 23/0286* (2013.01); *G05D 1/0077* (2013.01); *G06N 20/00* (2019.01); *H04L 9/0637* (2013.01)

(58) Field of Classification Search
None
See application file for complete search history.

(56) References Cited

U.S. PATENT DOCUMENTS

| | | | | |
|---|---|---|---|---|
| 11,456,871 B2 * | 9/2022 | Thomas | ............... | H04L 9/3213 |
| 2018/0315141 A1 * | 11/2018 | Hunn | ...................... | G06F 9/547 |
| 2019/0379699 A1 * | 12/2019 | Katragadda | ......... | H04L 63/1425 |
| 2021/0397891 A1 * | 12/2021 | Memon | ............... | G06K 9/6262 |

* cited by examiner

*Primary Examiner* — Atta Khan
(74) *Attorney, Agent, or Firm* — Norton Rose Fulbright US LLP (57) ABSTRACT

Embodiments provide systems, methods, and computer-readable storage media configured to leverage blockchain technologies to provide failsafe action and fault mitigation processing for autonomous systems. Such autonomous systems may include self-driving cars, logistics or manufacturing robots, or control processes in chemical manufacturing and processing facilities, or construction machinery or sites, and may utilize artificial intelligence (AI) and/or machine learning (ML) algorithms to control operations. These algorithms may be imperfect and subject to error. The disclosed blockchain-based techniques perform data analysis in a parallel and distributed manner (e.g., locally at the autonomous system and remotely at a node of a blockchain platform) to validate the information provided to the AI and/or ML algorithms, as well as the outputs of the algorithms. When anomalies or other issues are detected based on the data analysis, one or more failsafe actions may be executed to control operation of the autonomous systems in a safe manner.

23 Claims, 5 Drawing Sheets

BLOCKCHAIN-BASED FAILSAFE MECHANISMS FOR AUTONOMOUS SYSTEMS

TECHNICAL FIELD

The present disclosure relates to autonomous control systems and more particularly to techniques for leveraging blockchain technology to provide failsafe controls for autonomous systems.

BACKGROUND

Artificial intelligence (AI) and machine learning (ML) techniques are increasingly being utilized in real world scenarios. One notable real world scenario where AI and ML techniques are increasingly being leveraged is autonomous systems, such as autonomous driving systems for self-driving vehicles, automation of manufacturing plants, factory and packaging equipment, chemical manufacturing and petroleum extraction/refining plants, AI construction machinery and sites, and the like. The AI and ML algorithms utilized in such applications may include supervised or unsupervised learning techniques, reinforcement or deep learning algorithms, or other standard machine learning algorithms. These AI and ML algorithms are statistical in nature and due to data variations or imperfections, the possibility of failure in any single isolated test or event cannot be ruled out. Unlike traditional software, machine learning algorithms are not fully deterministic given inputs because the prediction or output of the algorithms is dependent on inputs, algorithm design, and the training data that is used to teach the algorithm how to respond to events. However, it is difficult (if not impossible) to create training data that will expose a learning algorithm to every type of event that may be encountered by the AI and ML algorithms used to control or provide inputs used to control navigation of autonomous vehicles.

Due to the difficulties associated with creating complete sets of training data (e.g., training data that represents all possible events and scenarios an autonomous vehicle may encounter) AI and ML based autonomous vehicle navigation systems that are completely (e.g., 100%) reliable cannot be created and all such algorithms, when deployed in real world environments, may encounter unknown scenarios (e.g., scenarios where the algorithms have not been sufficiently trained), which may cause the algorithms to provide outputs that result in an accident (e.g., a collision) or damage to persons or property. Additionally, due to the high model and input complexities associated with training and analyzing real world AWL deployments, the cause of an accident may also be extremely difficult to ascertain retrospectively, which limits the ability to retroactively create training data that may be used to train the AWL algorithms to avoid another accident or damage from occurring under the same or similar condition in the future.

Several real world examples highlight the above-described deficiencies of presently available AWL-based autonomous vehicles and machines. To illustrate, a number of accidents resulting in human injuries or deaths have occurred during autonomous vehicle testing in recent years. One accident occurred during testing of an autonomous vehicle by Uber and it was found that a failsafe system (e.g., emergency braking) had been disabled and the test was designed to rely on a human driver that was inside the vehicle to take control if an emergency situation arose. The vehicle's autonomous navigation system included machine learning-type classifier, but it was not programmed to identify pedestrians unless they were near crosswalks and failed to recognize a pedestrian walking across the street, resulting in a fatal accident. Accidents of a similar nature involving industrial robots in manufacturing plants have also occurred in Japan, Germany, the United States, and Europe and raised concerns with respect to the adequacy of safety measures for humans near the vicinity in which the robots are operating. Similarly, AI powered construction sites are also being piloted in Hong Kong, Dubai, and elsewhere where workers and machinery are detected by deep learning to help improve safety and efficiency. While the programming and AWL algorithms used by the autonomous vehicle, robots or machinery may be updated (e.g., to recognize pedestrians that were not near crosswalks), there are potentially other yet-unknown scenarios for which the programming is deficient. Relying on approaches to programming autonomous vehicles and machines that may result in human injury or property damage to occur before scenarios that need to be addressed by the programmed are identified is unacceptable.

SUMMARY

The disclosed embodiments provide systems, methods, and computer-readable storage media configured to leverage blockchain technologies to provide failsafe action and fault mitigation processing for autonomous systems. Exemplary autonomous systems to which the disclosed embodiments may be applied include autonomous vehicles, factory assembly, logistics, or manufacturing robots, chemical manufacturing or petroleum refinery or extraction plants, construction machinery or sites, or other types of autonomous systems (e.g., human-aided autonomous vehicles). For the example of autonomous systems, they may utilize artificial intelligence and/or machine learning algorithms to control navigation operations. For example, a well-publicized automatic cargo port project in TianJing, China in 2019 involved a few hundred of such autonomous (cargo) vehicles operating at speeds of 35 km/hr. However, AWL algorithms used for autonomous navigation are imperfect and subject to error, which may result in property damage, injury (e.g., to humans in the vicinity of the autonomous system), or other harmful results. Likewise, deaths, accidents, or explosions may occur near assembly, logistics robots or machinery, manufacturing robots, or chemical manufacturing or petroleum processing facilities, or construction machinery or sites.

The disclosed embodiments combine a blockchain system or platform which continuously stores operational status data of the autonomous system(s) and outputs of AWL algorithms in immutable blocks of a blockchain. Such data may be analyzed and subjected to a smart contract mechanism to assure failsafe operation with full resiliency. For example, the data analysis may detect a failed sensor, which could result in the AI/ML algorithms not detecting a nearby obstacle (e.g., a structure or human) and causing a collision. The smart contract based techniques may generate control data to execute failsafe actions designed to prevent the collision, such as to slow the speed of the autonomous system to a safe speed (e.g., a speed that is commensurate with the autonomous system's sensing capabilities), increase the speed of the autonomous system (e.g., to avoid a potential rear or side impact collision), stop the autonomous system, change the path of travel of the autonomous system (e.g., to avoid an obstacle), or other actions.

The blockchain-based analysis may also be performed in parallel by a node of the blockchain platform with more additional redundant nodes locally or remotely to provide resiliency. Depending on mission requirements and costs, the redundant node may reside locally as well as remotely. For such autonomous systems, the system will still function normally when only one of the two local systems is damaged (e.g., from a side collision or explosion on one side.) The data analyzed locally at the autonomous system may then be transmitted to the control center node of the blockchain platform, which can analyze the data available and generate additional actions as the case may be. The control center node data may be used to update the autonomous system and may override any locally generated actions (e.g., control data generated by the local smart contract or command data issued by a navigation subsystem of the autonomous system). In the event additional sources of information become available (e.g., from traffic surveillance drones in the future), then the control center would be in a good position to make use of such without autonomous system level changes.

With the capability to have redundant local nodes, even if one node's smart contract-based processing fails, the surviving node can continue the necessary smart contract action at the autonomous system level. This backup processing request, when transmitted, may include appropriate data to enable the node receiving the request to analyze the data and determine whether any failsafe actions should be implemented to ensure safe operations of the autonomous system.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF FIGURES

For a more complete understanding of the disclosed methods and apparatuses, reference should be made to the embodiments illustrated in greater detail in the accompanying drawings, wherein.

It should be understood that the drawings are not necessarily to scale and that the disclosed embodiments are sometimes illustrated diagrammatically and in partial views. In certain instances, details which are not necessary for an understanding of the disclosed methods and apparatuses or which render other details difficult to perceive may have been omitted. It should be understood, of course, that this disclosure is not limited to the particular embodiments illustrated herein

DETAILED DESCRIPTION

Figure 1:
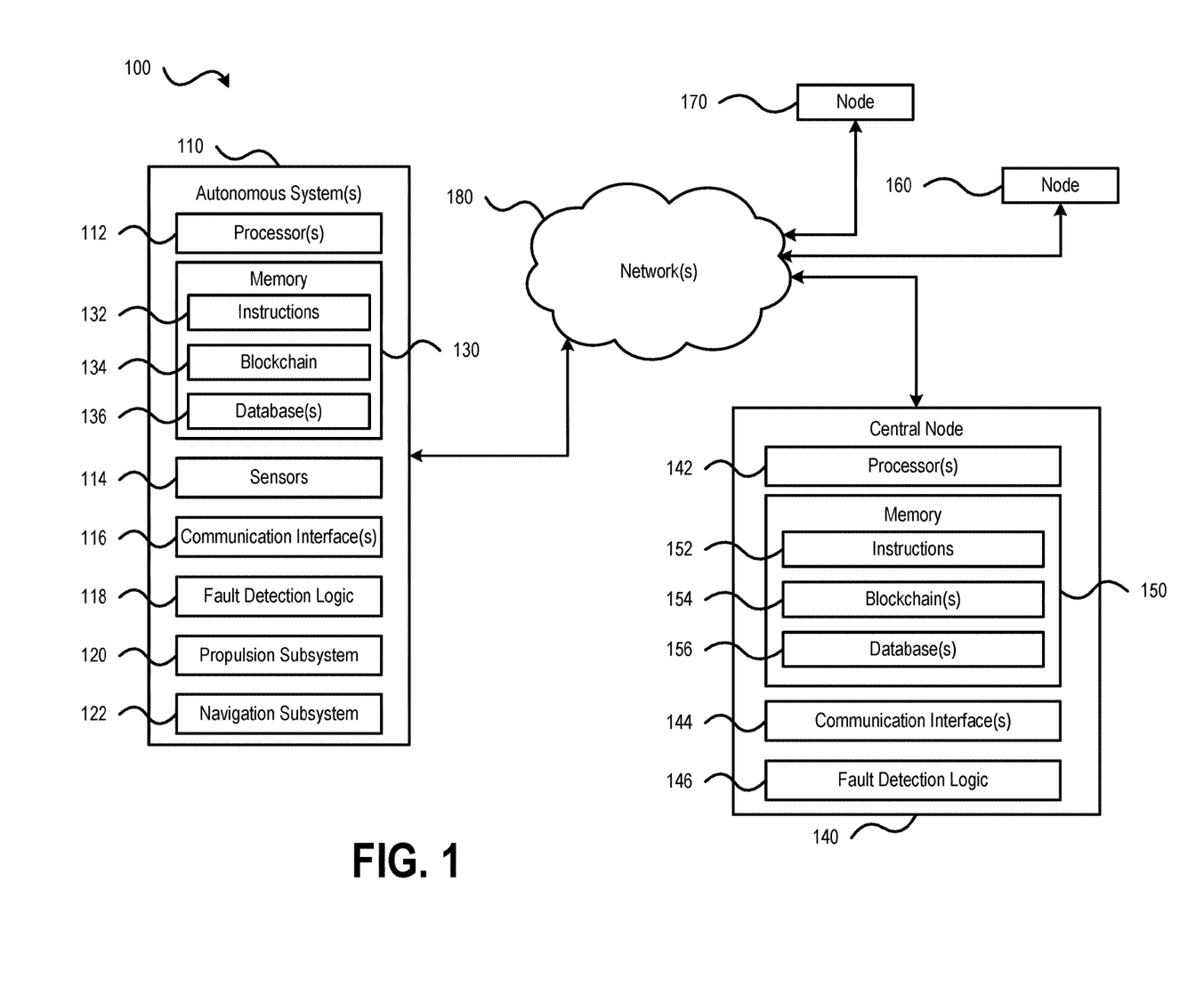
FIG. 1 is a block diagram of a system for leveraging blockchain technology to provide fault mitigation and failsafe action functionality for autonomous systems in accordance with aspects of the present disclosure.

Referring to FIG. 1, a block diagram of a system for leveraging blockchain technology to provide fault mitigation and failsafe action functionality for autonomous systems in accordance with aspects of the present disclosure is shown as a system 100. As shown in FIG. 1, the system 100 includes one or more autonomous systems 110 and a plurality of nodes 140, 160, 170. The autonomous system(s) 110 may be communicatively coupled one or more of the plurality of nodes 140, 160, 170 via one or more networks 180. The autonomous system(s) 110 may include autonomous vehicles (e.g., autonomous cars, trucks, boats, planes, tractors, etc.), autonomous robots (e.g., used for manufacturing or other purposes), or other types of autonomous systems. It is noted that while FIG. 1 illustrates a single autonomous system 110, the system 100 may be configured to support operations of a plurality of autonomous systems 110, such as a fleet of cars or trucks, etc. Additionally, while FIG. 1 illustrates 3 nodes, the system 100 may be supported by more than three nodes or less than three nodes. The particular number of nodes may depend on the number of autonomous systems 110 being supported by the system 100, the geographic distribution of the autonomous systems, or other factors. In actual deployment, hundreds or thousands of autonomous systems may be involved in operation.

The autonomous system 110 may include one or more processors 112, one or more sensors 114, one or more communication interfaces 116, fault detection logic 118, a propulsion subsystem 120, a navigation subsystem 122, and a memory 130. The one or more processors 112 may include central processing units (CPUs) or graphics processor units (GPUs) having one or more processing cores, microcontrollers, application specific integrated circuits (ASICs), field programmable gate arrays (FPGAs), or other circuitry and logic configured to facilitate the operations of the autonomous system 110. The memory 130 may include random access memory (RAM) devices, read only memory (ROM) devices, erasable programmable ROM (EPROM), electrically erasable programmable ROM (EEPROM), one or more hard disk drives (HDDs), one or more solid state drives (SSDs), flash memory devices, network accessible storage (NAS) devices, or other memory devices configured to store data in a persistent or non-persistent state. Software configured to facilitate operations and functionality of the autonomous system 110 may be stored in the memory 130 as instructions 132 that, when executed by the one or more processors 112, cause the one or more processors 112 to perform the operations described herein with respect to the autonomous system 110, as described in more detail below. Additionally, the memory 130 may be configured to store blocks of a blockchain 134 and one or more databases 136. Exemplary aspects of the blockchain 134 and one or more databases 136 are described in more detail below.

The one or more sensors 114 may include accelerometers, proximity sensors, thermal imaging devices, visual cameras, infrared cameras, gyroscopes, GPS sensors, LIDAR and/or radar systems, rain/flood sensors, smoke sensors, gas sensors, chemical sensors, humidity sensors, temperature sensors, pressure sensors, ultrasound sensors, or other types of sensors, or combinations of these types of sensors. The propulsion subsystem 120 may include motors (e.g., electric or carbon-fuel based motors), a driveshaft, a transmission, traction components (e.g., tires, wheels, treads, etc.), an altimeter, a barometer, a fuel system, a braking system, or other components that may be used to facilitate movement of the autonomous system 110. The navigation subsystem 122 may include a global positioning system (GPS), navigation logic (e.g., logic for determining a path of travel from a point of origin to a destination (and points in between)), control logic configured to generate commands (e.g., commands to control the speed, turning, stopping or braking, etc.) that may be provided to the propulsion subsystem 120 to control navigation of the autonomous system 110, or other components. The navigation subsystem 122 may include AI/ML based algorithms for performing obstacle detection, such as to identify obstacles (e.g., other autonomous systems; structures such as light poles, fences, railings, etc.; pedestrians; and the like) present in the environment the autonomous system 110 is operating within and collision avoidance (e.g., determine commands to provide to the propulsion subsystem 120 to navigate the autonomous system in a manner that avoids a collision or other unsafe conditions). It is noted that the AWL based algorithms used by the navigation subsystem 122 may vary depending on the particular configuration of the autonomous system 110. For example, TESLA manufactures vehicles that are capable of automated driving and the AI/ML algorithms used by TESLA's vehicles may be different from autonomous vehicles utilized by Uber or other entities. It is to be understood that the concepts disclosed herein are applicable to all AWL based navigation systems regardless of the manufacturer of the AI/ML based algorithms and the particular manner in which autonomous control of the vehicles or machines is implemented.

The one or more communication interfaces 116 may be configured to communicatively couple the autonomous system 110 to external devices and systems via one or more networks 180. The external devices and systems may include one or more other autonomous systems 110 (e.g., peer-to-peer communication), one or more of the plurality of nodes 140, 160, 170, other devices (e.g., cellular base stations (eNBs, gNBs, etc.), network access points, routers, and the like), or combinations thereof. Communication between the autonomous system 110 and the external devices and systems via the one or more networks 180 may be facilitated via wired or wireless communication links established according to one or more communication protocols or standards (e.g., an Ethernet protocol, a transmission control protocol/internet protocol (TCP/IP), an Institute of Electrical and Electronics Engineers (IEEE) 802.11 protocol, and an IEEE 802.16 protocol, a 3rd Generation (3G) communication standard, a 4th Generation (4G)/long term evolution (LTE) communication standard, a 5th Generation (5G) communication standard, and the like).

The fault detection logic 118 may be configured to analyze sensor data generated by the one or more sensors 114, outputs of the navigation subsystem 122, and other data to detect unsafe operating conditions or other anomalies for which accident avoidance and mitigation operations should be taken. As an example, the fault detection logic 118 may detect that a scenario that cannot be resolved using the AWL algorithms and may initiate operations to override the navigation subsystem 122 to control operation of the autonomous system 110 in a safe manner, such as to decelerate or stop the autonomous system 110, alter the path of travel of the autonomous system 110, or other operations. Additional aspects of the fault detection logic 118 are described in more detail below.

As illustrated in FIG. 1, the plurality of nodes 140, 160, 170 may be in communication with the one or more autonomous systems 110 via the one or more networks 180. The plurality of nodes may include a central node 140 and peripheral nodes. The central node 140 may include one or more processors 142, one or more communication interfaces 144, fault detection logic 146, and a memory 150. The one or more processors 142 may include CPUs or GPUs having one or more processing cores, microcontrollers, ASICs, field FPGAs, or other circuitry and logic configured to facilitate the operations of the autonomous system 110. The memory 130 may include RAM devices, ROM devices, EPROM, EEPROM, one or more HDDs, one or more SSDs, flash memory devices, NAS devices, or other memory devices configured to store data in a persistent or non-persistent state. Software configured to facilitate operations and functionality of the central node 140 may be stored in the memory 150 as instructions 152 that, when executed by the one or more processors 142, cause the one or more processors 142 to perform the operations described herein with respect to the central node 140, as described in more detail below. Additionally, the memory 150 may be configured to store information as blocks in one or more blockchains 154 and one or more databases 156. Exemplary aspects of the blockchain(s) 154 and the one or more databases 156 are described in more detail below.

The communication interface(s) 144 may be configured to communicatively couple the central node 140 to external devices and systems via one or more networks 180. The external devices and systems may include one or more autonomous systems 110, other nodes of the plurality of nodes (e.g., the nodes 160, 170), other devices (e.g., cellular base stations (eNBs, gNBs, etc.), network access points, routers, and the like), or combinations thereof. Communication between the central node 140 and the external devices and systems via the one or more networks 180 may be facilitated via wired or wireless communication links established according to one or more communication protocols or standards (e.g., an Ethernet protocol, a TCP/IP, an IEEE 802.11 protocol, and an IEEE 802.16 protocol, a 3G communication standard, a 4G/LTE communication standard, a 5G communication standard, and the like).

The fault detection logic 146 may be configured to analyze data generated by autonomous systems (e.g., the autonomous system 110), such as sensor data generated by the one or more sensors 114, outputs of the navigation subsystem 122, and other data, to detect unsafe operating conditions or other anomalies for which accident avoidance and mitigation operations should be taken. As an example, the fault detection logic 146 may detect a scenario that cannot be resolved using the AI/ML algorithms and may initiate operations to override the navigation subsystem 122 to control operation of the autonomous system 110 in a safe manner, such as to decelerate or stop the autonomous system 110, alter the path of travel of the autonomous system 110, or other operations. Additional aspects of the fault detection logic 146 are described in more detail below. It is noted that many of the operations of the fault detection logic 146 are similar to the fault detection logic 118 of the autonomous system 110 and may be provided for redundancy and safety. For example, if the fault detection logic 118 fails (e.g., due to a hardware malfunction, etc.) the fault detection logic 146 of the central node 140 (or another node) may identify an anomaly and initiate appropriate actions to mitigate an accident, as described in more detail below.

The autonomous system 110 generates various types of information as it is operated within an environment (e.g., a road, a warehouse, etc.). To illustrate, as the autonomous system 110 operates within an environment, speed data may be generated via an accelerometer, temperature data (e.g., temperature of a motor, ambient temperature, etc.) may be generated by one or more temperature sensors, and pressure data (e.g., pressure of one or more tires, pressure forces being generated by loads carried by the autonomous system 110, etc.) may be generated by pressure sensors. It is noted that the types of data described above have been provided for purposes of illustration, rather than by way of limitation and that or other types of data may be generated by the sensors 114. In addition to the sensor data generated by the sensors 114, other types of data may also be generated. For example, the navigation subsystem 122 may generate navigation data to control movement of the autonomous system 110 by the propulsion subsystem 120. The navigation data may indicate a direction of travel, commands provided to the propulsion subsystem (e.g., acceleration commands, deceleration commands, turning commands, braking commands, etc.), or other information. Data may also be generated by the AI/ML algorithms of the navigation subsystem 122, such as information that indicates the presence of obstacles in or near the path of travel of the autonomous system 110, classifications of the identified or detected obstacles, such information that indicates whether the obstacle is another autonomous system, a person, a structure (e.g., a light pole, a barricade, a railing, etc.), and the like.

As the data is generated by the various components of the autonomous system 110 it may be recorded to blocks of the blockchain 134. The blockchain 134 may be configured to store data as immutable records, referred to "blocks." Each block of the blockchain 134 may include new data being recorded to the blockchain 134, such as data generated by the sensors 114 and other subsystems during operation of the autonomous system 110 (e.g., the sensor data, the navigation data, the data output by the AI/ML algorithms, the data provided as inputs to the AWL algorithms, etc.) as well as other information. When data is recorded to a new block of the blockchain 134, a hash of the data recorded to a previous block of the blockchain may also be calculated and recorded in the new block. Including the hash of the previous block may provide an additional level of security and trustworthiness to the data of the blockchain 134. For example, when data is written to a new block of the blockchain 134 with a hash of the previous block, alteration of the information recorded in the previous block may be detected using the hash stored in the new block (e.g., because the altered data would have a different hash than the original data). As the blockchain 134 grows longer and includes more blocks it becomes more difficult to manipulate the data recorded to the blockchain 134 as more blocks would need to be modified in order to prevent discovery of the tampering, resulting in a mechanism for recording data that provides a level of trust for the data being recorded. The trust provided by the blockchain 134 may ensure that actors involved in operation of the autonomous system 110 do not attempt to alter the data when an accident occurs, thereby enabling causes of accidents to be discovered and more accurately analyzed.

In an aspect, the data recorded to the blocks of the blockchain 134 may include a hash of the operational data (e.g., the sensor data, the navigation data, the data output by the AI/ML algorithms, the data provided as inputs to the AWL algorithms, etc.), rather than actually recording the data to the blockchain 134, and the actual data may be stored as records in the database 136. To illustrate, the sensor data, the navigation data, the outputs of the AWL algorithms, etc. may be recorded to a record of the database 136 and a hash of the data recorded to the database 136 may be stored to a block of the blockchain 134 (along with the hash of the previous block). Storing the hash of the data instead of the actual data may reduce the size of the blocks of the blockchain, which may be beneficial for minimizing the amount of memory required to maintain the blockchain 134. Additionally, storing the hash of the data recorded to the database 136 may enable authentication of the database records despite the data being recorded separate from the blockchain. For example, to verify the authenticity of the data recorded to the database 136, a record of the database may be used to calculate a hash value and that hash value may be compared to the hash recorded to the blockchain. If the hash values match, the data recorded to the database 136 may be authenticated and if the hash values do not match the data may be determined to have been altered or manipulated. In an aspect, timestamps may be utilized to provide a time sequencing for the data regardless of whether the data is recorded to blocks on the blockchain 134 directly or as a record in the database 136 and a hash on the blockchain 134. For example, blocks of the blockchain 134 and/or records of the database 136 may be timestamped to allow the data recorded therein to be sequenced in time, which may be beneficial for periodic analysis of the data (e.g., to update/train the AI/ML algorithms, verify operations of propulsion subsystem 120 and/or the navigation subsystem 122, and the like).

As the data is generated by the autonomous system 110, the data may be transmitted to the central node 140 or other nodes of the plurality of nodes, where the data may be similarly recorded to a blockchain (e.g., the blockchain 154) or a database and blockchain (e.g., the database 156 and blockchain 154) using the techniques described above. It is noted that while the blockchain 134 may be specific to the autonomous system 110, the one or more blockchains 154 of the central node 140 may include blockchains related to many autonomous systems. For example, the one or more blockchains 154 may include a blockchain corresponding to the blockchain 134 and other blockchains corresponding to other autonomous systems. The plurality of nodes may be configured to perform parallel blockchain processing, thereby allowing multiple blockchains to be simultaneously executed and maintained. Exemplary aspects of parallel blockchain processing are described in U.S. patent application Ser. No. 16/739,083, filed Jan. 9, 2020 and entitled "Parallel Blockchain Processing," the content of which is incorporated herein by reference in its entirety.

In addition to providing improved data security and trustworthiness via the use of blockchain technology, the system 100 may provide fault mitigation processing functionality that may prevent accidents from occurring due to deficiencies in the AI/ML algorithms or other deficiencies of the control processes for the autonomous system 110. For example and referring to FIG. 2, a block diagram illustrating blockchain-based processing of autonomous system data to provide fault mitigation and failsafe action functionality in accordance with aspects of the present disclosure is shown.

Figure 2:
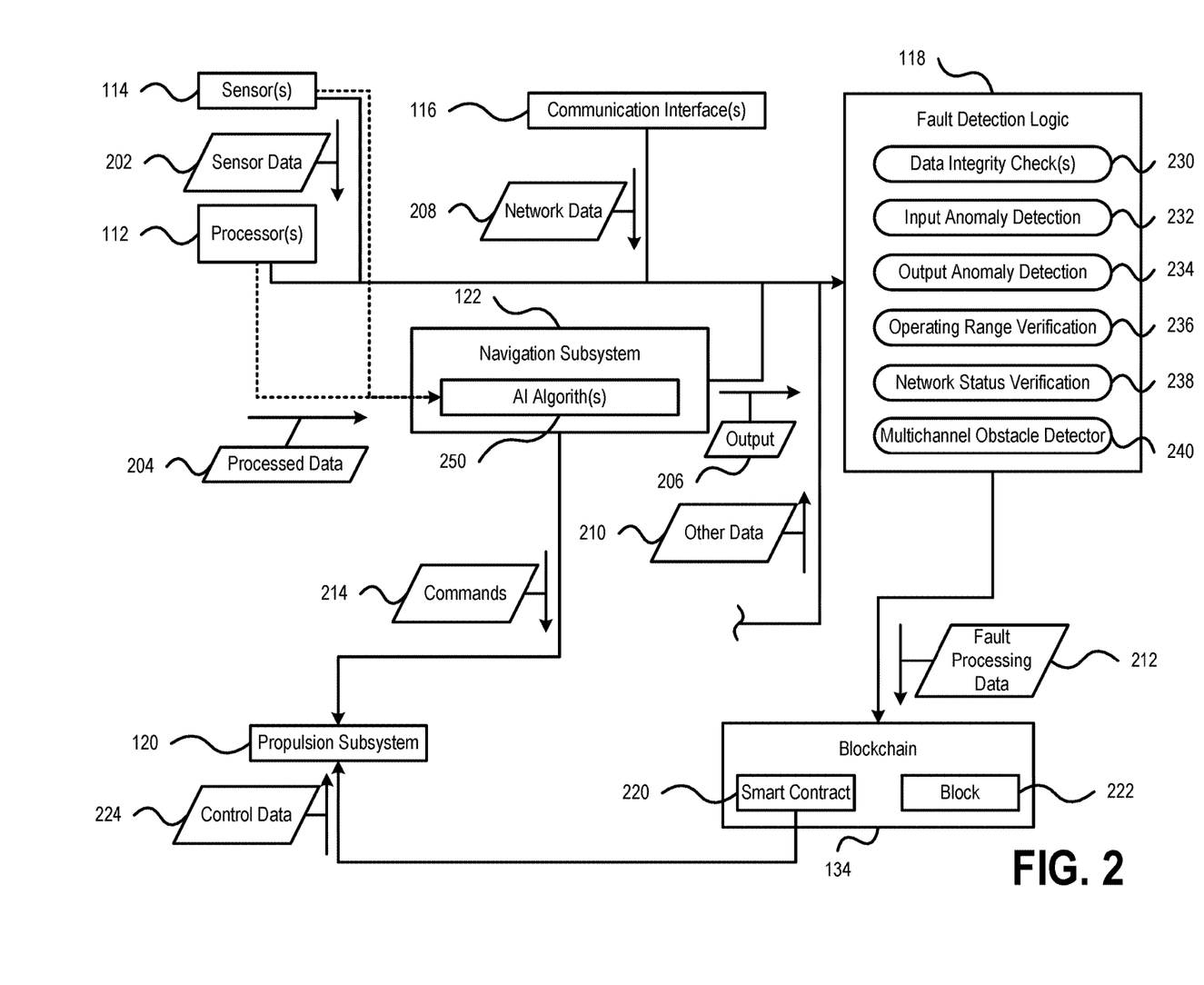
FIG. 2 is a block diagram illustrating blockchain-based processing of autonomous system data to provide fault mitigation and failsafe action functionality in accordance with aspects of the present disclosure.

As briefly described above with reference to FIG. 1, the sensors 114 may generate sensor data 202 during operation of the autonomous system 110. The sensor data 202 may be provided to an AI/ML algorithm 250 of the navigation subsystem 122 and may be analyzed to detect obstacles or other information present in the environment surrounding the autonomous system 110. For example, media content (e.g., image and/or video data) provided by a camera may be analyzed using the AI/ML algorithms 250 to determine whether any other autonomous systems are near the autonomous system 110, whether any pedestrians are near the path of travel of the autonomous system 110, whether any structures (e.g., boxes, railings, light poles, barricades, etc.) are in or near the path of travel of the autonomous system 110, or other information. Additionally, speed data may be provided by an accelerometer to provide information regarding a speed of travel of the autonomous system 110. Infrared images may be provided by an infrared camera and used to distinguish between human objects and non-human objects (e.g., human objects may have a heat signature that may be recognized by the AI/ML algorithms 250 while other objects may not. It is noted that the infrared images may also be used for other purposes and the example of using thermal imaging data to identify humans is just one non-limiting example of how thermal imaging data may be used by the AWL algorithms 250.

In aspects, some of the data provided to the AWL algorithms 250 may require processing prior to being provided as an input to the AWL algorithms. For example, one or more of the AI/ML algorithms 250 may require input data to be provided in a specific format (e.g., a numeric format) and filtered to a certain range of values and low level of noise to be suitable for use with the AI/ML algorithm(s). Examples of such data include electrical signals from the vehicle's components, which are typically noisy. Digital and/or direct current signals (+/−12V) may show sudden switching values which can create problems in the numerical algorithms. Where such pre-processing is needed, the one or more processors 112 may perform pre-processing of the data, which may include some of the data generated by the sensors 114, and provide processed data 204 to the AI/ML algorithms 250, where the processed data 204 includes data that is configured for input into the relevant AWL algorithm(s).

The AI/ML algorithms 250 may receive the sensor data 202 and the processed data 204 as inputs and generate one or more outputs 206. Exemplary outputs that may be determined by the AWL algorithms 250 may include detected obstacles (e.g., objects or persons) in the path of travel or proximate the path of travel of the autonomous system 110. It is noted that every detected obstacle may not require adjustment to the path of travel or operation of the autonomous system. For example, where an obstacle is detected 10 feet to the side of the path of travel the autonomous system 110 and the obstacle is determined to be stationary, no action may be needed as the path of travel of the autonomous system 110 is not predicted to collide with the obstacle. In some instances, obstacles not within the path of travel of the autonomous system 110 may nevertheless result in alteration of the operation of the autonomous system 110. To illustrate, suppose that a stationary obstacle is identified and determined to be a person standing 10 feet to the side of the path of travel of the autonomous system 110. The navigation subsystem 122 may determine to slow the speed of the autonomous system 110 even though a collision with the person is not predicted in order to provide sufficient time to react and avoid a collision if the obstacle starts to move towards the path of travel of the autonomous system 110. Any commands determined by the navigation subsystem 122 to control autonomous navigation of the autonomous system 110 may be provided as commands 214 to the propulsion subsystem 120. Exemplary commands that may be provided to the propulsion subsystem 120 may include steering commands (e.g., commands to turn the autonomous system 110 or otherwise control steering of the autonomous system 110 along an intended path of travel), speed commands (e.g., commands to control the speed at which the autonomous system 110 travels along an intended path, which may include commands related to acceleration and deceleration (or braking) of the autonomous system), emergency commands (e.g., commands to control emergency actions, such as emergency braking or steering), or other types of commands. It is noted that emergency commands may be special commands that may override aspects of normal navigation operations. For example, normal navigation operations may limit the deceleration rate of the autonomous system 110 to promote smooth stops. When emergency braking commands are issued to the propulsion and control subsystem 120 the deceleration limits may be ignored to allow the autonomous system 110 to stop as quickly as possible, which may allow a predicted collision to be avoided. It is noted that the exemplary commands described above have been provided for purposes of illustration, rather than by way of limitation and that autonomous systems to which the concepts described herein may be applied may utilize other commands not explicitly described herein.

When applied to petrochemical or chemical manufacturing plant process control systems, the navigation subsystem 122 and the propulsion subsystem 120 may not be present and may instead be replaced by operation-specific process control subsystems, such as drilling, pumping, reagent flow-rate, and reactor parameter control. The other described processing related to AI/ML algorithms described with reference to FIG. 2 may be unchanged. In petrochemical or chemical manufacturing autonomous systems, the failure event to avoid may correspond to potential human life lost or endangerment due to fire outbreaks, toxic emissions, or explosions.

As shown in FIG. 2, the sensor data 202 and the processed data 204 may be provided to the fault detection logic 118. Additionally, outputs 206 generated by navigation subsystem 122 may be provided to the fault detection logic 118. The outputs 206 may include the AI/ML algorithms 250 as well as other information, such as the commands determined by the navigation subsystem 122. Thus, the fault detection logic 118 may receive the data input to the navigation subsystem 122, as well as the outputs generated by the navigation subsystem 122 and its sub-processes (e.g., the AWL algorithms 250, etc.). The fault detection logic 118 may also receive network data 208 from the communication interface(s) 116 and other data 210. The other data 210 may include data from a control center accessible via the one or more networks 180, nearby vehicles or machines, mobile phones sharing information using V2X protocols for safety and collision avoidance, tracking surveillance drones, GPS satellites, or other types of data obtained from external sensors. The fault detection logic 118 may analyze the sensor data 202, the processed data 204, the output data 206, the network data 208, and the other data 210 to detect anomalies or problems that may not have been caught by the AI/ML algorithms 250 and the navigation subsystem 122.

As shown in FIG. 2, the fault detection logic 118 may be configured to subject the input data (e.g., the sensor data 202, the processed data 204, the output data 206, the network data 208, and the other data 210) to various types of analysis to detect the anomalies. Exemplary analysis may include data integrity checks 230, input anomaly detection 232, output anomaly detection 234, operating range verification 236, network status verification 238, and multichannel obstacle detection 240. As briefly described above, AWL algorithms may fail for a variety of reasons, such as sensor failures, wrong data values or data types, wrong predictions, malicious network attacks, changes in operating environment and context. Three fault categories that may directly impact the reliability of the AI/ML, algorithms are: (1) data integrity and quality issues (e.g., when sensors have failed or data becomes corrupted due to poor integrity or quality checking); (2) poor model prediction (e.g., insufficient or unrepresentative training or testing data; and/or (3) when model is deployed in an entirely different context (e.g., when the model(s) used by the AWL algorithms are trained to understand data in a first context and a situation presenting similar data to the model in a second and different context occurs leading to a potentially incorrect prediction based on the model). Such conditions may be detected by various data analysis processes 230-240 through a series of different steps configured to perform data integrity checks and profiling, and anomaly detection for the sensor data 202 and the processed data 204 provided as inputs to the AI/ML algorithms 250. Anomaly detection processes may utilize clustering algorithms to detect outlier values. Additionally, historical numeric range of operation and distribution properties of the AI/ML algorithm inputs and outputs may be checked for anomalies.

The data integrity checks 230 may be configured to verify that portions of the input data are valid (e.g., sensors of the autonomous system 110 are providing sensor data). If more than one data channel failed in a certain context (e.g., during bad weather or nighttime operation), then safe operation of the autonomous system 110 cannot be guaranteed. For example, the sensor data 202 may be determined to be missing values for one or more sensors (e.g., a radar or LIDAR sensor did not provide data, thermal/infrared sensors data failed, etc.), which may signify that the autonomous system 110 may be unable to determine the presence of some types of obstacles in the vicinity of the autonomous system 110, and a failsafe operation may be initiated to modify operation of the autonomous system 110 (e.g., slow down or stop the autonomous system 110, etc.) to increase safety.

The input anomaly detection 232 may be configured to verify that the information input to the navigation subsystem 122 and the AI/ML algorithms 250 (e.g., the sensor data 202 and the processed data 204) does not contain any errors or anomalies. For example, normal value ranges for the sensor data 202 may be checked against the actual values of the sensor data 202 to verify that the sensor data 202 does not contain information that is outside a normal operating range. The presence of sensor data that is outside a normal operating range may indicate a failed sensor, which may cause the AI/ML algorithms 250 to generate incorrect outputs that are then used to control navigation of the autonomous system 110. For example, sensors used to detect obstacles near the autonomous system 110 (e.g., radar, LIDAR, thermal or infrared sensors, etc.) may normally provide information about nearby obstacles up to a certain distance but that distance may shorten in rainy or foggy weather. If portions of the sensor data 202 received from the sensors 114 indicate reduced detection ranges as compared to normal operating conditions (e.g., clear weather, no rain or fog, etc.), the input anomaly detection 232 may determine one or more failsafe operations to be executed, such as to slow the autonomous system 110 down to a speed sufficient to provide reaction times that permit evasive actions to be taken within the reduced detection distance provided by the sensors.

The output anomaly detection 234 may be configured to verify that the information input to the navigation subsystem 122 and the AI/ML algorithms 250 (e.g., the sensor data 202 and the processed data 204) does not contain any errors or anomalies. For example, if the outputs 206 include information that is out of a normal range of values or that is inconsistent with safe operating conditions (e.g., speed of operation, turn radius, etc.) of the autonomous system 110, an anomaly may be detected. As another example, if the GPS data previously indicated the autonomous system 110 was at a first location and GPS data received for a current time period does not include GPS location data, the output anomaly detection analysis may determine that GPS communication is not working properly. When problems are detected by the output anomaly detection 234, one or more failsafe operations may be executed to modify operation of the autonomous system 110.

The operating range verification 236 may analyze the input data (e.g., the data provided to the fault detection logic 118) to determine whether any of the input data values are invalid. For example, the overall distribution and range of data input to and output by the AI/ML algorithms 250 may be checked against historical reference data for the AI/ML models to verify that the data (e.g., the sensor data 202 and the processed data 204) are within historical ranges. When anomalies are detected by the operating range verification 236 a failsafe action may be executed to modify operations of the autonomous system 110.

The network status verification 238 may analyze the network data 208 to detect the presence of network-based attacks. The network status verification 238 may utilize network management and monitoring (e.g. SNMP) to monitor latency and throughput measurements to detect abnormally high levels of network activities. Non-limiting examples of network issues that may be detected by the network status verification 238 may include denial of service attacks, packet loss, corrupted network traffic or data, or network congestion. Such issues may prevent the autonomous system 110 from transmitting data to and receiving data from external systems and devices, which could create potentially unsafe conditions within the environment where the autonomous system 110 is operating. If the system 100 and/or the autonomous system 110 are hampered by network over-activity (e.g., from congestion or attacks) or other network issues, a failsafe action may be performed to modify operations of the autonomous system 110.

The multichannel obstacle detector 240 may analyze the other data, such as location data, information obtained from addon sensors, and other devices to detect anomalies or other information indicative of unsafe operating conditions or potential problems with sensors and equipment of the autonomous system 110. In aspects, a deterministic model may be constructed to complement and cross-check the predictions by the AI/ML algorithms. For example, localization of obstacles may be determined by the multichannel obstacle detector 240 combining dead-reckoning detection techniques with information obtained from devices associated with nearby humans and vehicles to independently verify the locations of obstacles determined by the AI/ML algorithms 250 are correct or not. The location and distance information used to verify the processing of the AWL algorithms 250 may include location information obtained from GPS modules (e.g., GPS modules of nearby vehicles or smartphones) or nearby V2X data sources. Such information may be shared via a communication network (e.g., a cellular communication network, satellite networks, etc.), peer-to-peer communication between nearby autonomous systems, mobile applications sharing mobile user position or location info, and sensors configured to provide direct distance information without requiring object recognition such as ultrasound sensors, LIDAR in dead-reckoning mode, discrete data from devices using V2X protocols to send proximity information, or other position location techniques.

Some of the location information may be shared anonymously. For example, when users (e.g., pedestrians or drivers) share their location from a smartphone (e.g., via a mobile application or in response to a prompt by a network), location information may be transmitted as a broadcast that may be detected by the autonomous system 110 (e.g., via the communication interface or another data transmission/reception technique), but the broadcasted data may not include user identifying information. In some aspects, a portion of the other data may be obtained from external sources, such as drones, location sensing devices placed proximate paths of travel for the autonomous system 110 (e.g., in a warehouse, near street corners or intersections, crosswalks, loading docks, etc.). During normal operation the location of nearby obstacles, as determined by the AWL algorithms 250, may be within a threshold distance of the location data shared by nearby autonomous systems and users, such as within a few inches, feet, etc. However, when the distance between the location of obstacles determined by the AI/ML algorithms 250 and the locations shared by external autonomous systems and/or users varies by more than the threshold distance, it may be determined that the AI/ML algorithms 250 are not operating in a reliable manner and failsafe actions may be initiated, as described in more detail below.

The fault detection logic 118 may be configured to write information to the blockchain 134. For example, as shown in FIG. 2, fault processing data 212 may be written to a block 222 of the blockchain 134. Each block of the blockchain 134 may include a plurality of fields, such as a block identifier (ID) or block number, a timestamp that records the time the block was created, a hash value derived from the previous block, a data packet and a digital signature which, in one implementation may be a hash value of the entire block. It is noted that the exemplary fields described above are provided for purposes of illustration, rather than by way of limitation and the blocks of blockchains according to aspects of the present disclosure may include different fields and/or more or less fields than those specifically described above.

The data packet may include one or more fields for content related to the data payload of the block and the contents of the data packet may depend on the particular implementation of the system 100. For example, the block 222 may include a hash of a previous block as well as a data packet that includes all or a portion of the fault processing data 212 (or a hash of the fault processing data 212). The fault processing data 212 may include all of the information considered by the fault detection logic 118. For example, fault processing data 212 may include the sensor data 202, the processed data 204, the output data 206, the network data 208, and the other data 210. As another example, the fault processing data 212 may include portions of the sensor data 202, the processed data 204, the output data 206, the network data 208, and the other data 210. To illustrate, the portions of the fault processing data 212 recorded to the data packet of the block 222 may be determined based on identification of an anomaly by the fault detection logic 118, such as to include information upon which an anomaly has been identified in the data packet. In additional or alternative aspects, the fault processing data 212 may include specific portions of the sensor data 202, the processed data 204, the output data 206, the network data 208, and the other data 210 (e.g., location data, speed data, direction data) and any information upon which an anomaly was detected. It is noted that the data recorded to the blockchain 134 for each processing cycle of the fault detection logic 118 may be different, with a first portion of the information considered by the fault detection logic 118 being recorded to a block of the blockchain 134 during a first time period and a second different portion of the information considered by the fault detection logic 118 being recorded to a block of the blockchain 134 during a second time period.

In an aspect, one or more master smart contracts 220 may be recorded to the blockchain 134. The one or more smart contracts 220 may include software configured to determine control data based on the fault processing data 212. For example, the fault processing data 212 may be provided as an input to a smart contract of the blockchain 134 and the smart contract may be configured to determine whether an anomaly was detected. If an anomaly was detected by the fault detection logic 118, as indicated by the fault processing data 212, the smart contract may determine control data 224 that may be provided to the propulsion subsystem 120 to control aspects of operation of the autonomous system 110. For example, if a sensor used to detect obstacles in the vicinity of the autonomous system 110 is determined to have potentially failed or malfunctioned based on analysis of the sensor data 202, the output data 206, or some other information, the smart contract 220 may issue control data 224 configured to slow down or stop the autonomous system 110. As another example, the smart contract 220 may detect issues other than failed sensors, such as to detect that the autonomous system 110 is operating in an environment where it is raining (e.g., based on data provided by a rain sensor). The smart contract 220 may determine that unsafe conditions exist because the AI/ML algorithms 250 may not be able to account for the impact of the rain on various sensors used for obstacle detection (e.g., the AI/ML algorithms 250 may be treated as untrustworthy or unreliable) or that sensors relied on by the AWL algorithms 250 for location and distance ranging are operating at a reduced capability (e.g., due to the weather), which may lead to improper detection of obstacles proximate the autonomous system 110. When such conditions are detected, the smart contract 220 may issue control data 224 to mitigate the chances of an accident, such as to slow the speed of the autonomous system 110 (e.g., the speed decrease may be configured to account for reduced obstacle detection distances caused by the rain and the slower speed may be determined to provide appropriate stopping capabilities within the reduced obstacle detection distance and potentially slippery conditions). The control data 224 generated by the smart contract(s) 220 may be recorded to the blockchain 134 in the same block or a different block as the fault processing data 212. It is noted that in some aspects the functionality provided by the fault detection logic 118 (e.g., the various processes 230-240) may be incorporated into different ones of the smart contracts 220, rather than being performed by the fault detection logic 118, and relevant portions of the data may be provided to the smart contracts 220 for anomaly detection processing and control data generation.

In an additional or alternative aspect, the one or more smart contracts 220 may be configured to implement the functionality described with respect to the fault detection logic 118. For example, the sensor data 202 and the processed data 204 may be provided to a smart contract configured to perform the data integrity check 230, the input anomaly detection 232; the output data 206 may be provided to a smart contract configured to perform the output anomaly detection 234, and other smart contracts may be configured to perform the processing described with respect to the operating range verification 236, the network status verification 238, and the multichannel obstacle detection 240. In yet another additional or alternative aspect, a single smart contract may be configured to receive the data provided to the fault detection logic 118 and perform the various data analysis processes described with respect to 230-240.

In an aspect, control data 224 provided by the smart contracts 220 may be configured to override the commands 214 provided by the navigation subsystem 122. For example, suppose the navigation subsystem 122 provides commands 214 to control the speed and direction of travel of the autonomous system 110 and that the smart contracts 220 determine a different mode of operation for the autonomous system 110 (e.g., a different speed, a different direction of travel, or another control operation). When the control data 224 is provided to the propulsion subsystem 120 it may be prioritized such that the autonomous system 110 is operated and controlled in compliance with the control data 224, rather than the commands 214 provided by the navigation subsystem 122. Such functionality may enable the autonomous system 110 to operate in a manner that reduces or eliminates the likelihood that an error or flaw in the AI/ML algorithms 250 results in an accident, such as an accident caused by the autonomous system 110 being presented with conditions for which the AI/ML algorithms 250 have not been trained to handle.

It is noted that the blockchain technologies described herein may be capable of executing smart contracts to process data and recording data to the blockchain 134 very quickly. For example, transactions on the blockchain 134 (e.g., smart contract transactions and data recordation transactions) may occur at rates of 10 transactions per millisecond and in some implementations at rates in excess of 100 transactions per millisecond. These capabilities may enable data to be recorded to the blockchain 134 in real time or near real time, allowing immutable records to be generated that detail the conditions of the autonomous system 110 and its surrounding environment to be recorded to the blockchain 134. Moreover, the processes described above with respect to FIG. 2 may also be performed in a parallel and distributed manner by one or more nodes of a blockchain platform (e.g., the plurality of nodes 140, 160, 170 of FIG. 1).

Figure 3:
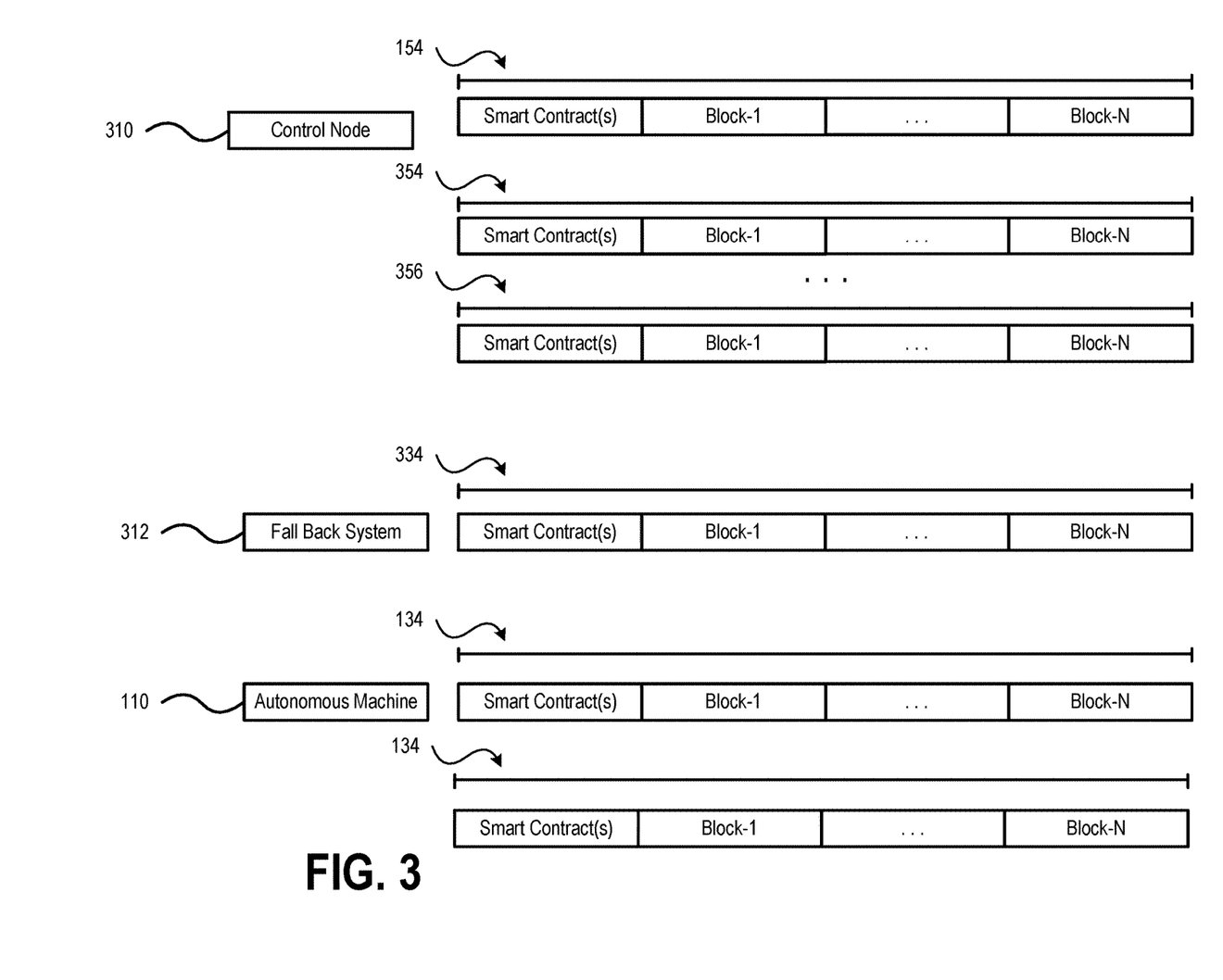
FIG. 3 is a block diagram illustrating aspects of performing parallel and distributed fault mitigation and failsafe action processing using blockchain technology in accordance with aspects of the present disclosure.

For example and referring to FIG. 3, a block diagram illustrating aspects of performing parallel and distributed fault mitigation and failsafe action processing using blockchain technology in accordance with aspects of the present disclosure is shown. In FIG. 3, the autonomous system 110 of FIG. 1 is shown. Additionally, a control node 310 and a fallback system node 312 are shown. The control node 310 may be a node of the blockchain platform (e.g., one of the nodes 140, 160, 170 of FIG. 1). The fallback system node 312 may be a second blockchain node that is local to the autonomous system (e.g., the autonomous system 110 of FIG. 1) or may be a node of the blockchain platform that is remote from the autonomous system, as described in more detail below. As illustrated in FIG. 3, the autonomous system 110 may maintain a blockchain 134, which may include one or more smart contracts (e.g., the smart contract(s) 220 of FIG. 2) and a plurality of blocks, shown as blocks 1-N. As described above with reference to FIG. 2, the plurality of blocks of the blockchain 134 may record data associated with redundant processing performed with respect to data generated during operations of the autonomous system 110 to detect anomalies and other issues that could indicate unsafe conditions for the autonomous system.

As the autonomous system 110 operates, the various types of data generated by the sensors 114 and other systems of the autonomous system 110 may be transmitted (e.g., via the communication interface(s) 116 of FIG. 1) to one or more of the plurality of nodes, such as the fallback system node 312 and the control node 310. The control node 310 may be configured to perform similar processing of the data as described above with reference to the autonomous system 110 using the fault detection logic 146 and smart contracts of the blockchain 154 (e.g., in a redundant fashion). The control node 310 may receive additional intelligence from additional sources, such as control data transmitted to the autonomous system by a smart contract. In this case, the control data may override the commands 214 issued by the local navigation subsystem 122 and may also be prioritized over the control data 224 generated by the smart contract(s) 220 of the blockchain 134.

Utilizing the control node 310 may help provide additional safeguards against unsafe operation of the autonomous system 110. For example, while the smart contract(s) 220 of the blockchain 134 may provide functionality to monitor and validate processes used to control navigation of the autonomous system 110 (e.g., the AI/ML algorithms 250), the parallel and distributed processing performed by the control node 310 may provide mechanisms and functionality to ensure that the failsafe mechanisms provided by the smart contract(s) 220 of the blockchain 134 are provided consistently even in the event of a failure associated with the blockchain 134. Moreover, providing redundant recordation of data and fault detection processing via the blockchain 154 of the control node 310 may also enable data indicative of the operation of the autonomous system 110 to be obtained in the event that the local data stored on the blockchain 134 is destroyed (e.g., a memory device failure, etc.), thus providing more complete 'black box' like recording functionality.

As shown in FIG. 3, the control node 310 may also maintain additional blockchains, such as a blockchain 354 and a blockchain 356. These other blockchains may be associated with other autonomous systems and each of the other autonomous systems may include a local blockchain similar to the blockchain 134 that is utilized to provide local failsafe monitoring and fault detection similar to the processes described above with reference to FIG. 2. It is noted that FIG. 3 illustrates the control node 310 maintaining 3 blockchains corresponding to 3 different autonomous systems for purposes of illustration, rather than by way of limitation and that nodes configured according to aspects of the present disclosure may maintain more than three blockchains (e.g., in support of more than three autonomous systems). In some aspects the nodes may maintain data corresponding to multiple autonomous systems in a single blockchain (i.e., instead of maintaining a single blockchain for each autonomous system) or may maintain a single blockchain for autonomous systems associated with a single entity (e.g., a fleet of autonomous systems operating under the control of a first entity), and different blockchains may be maintained for autonomous systems of different entities. In actual implementation the control node 310 could be in a fixed Internet facility or simply another better equipped autonomous system (or machines).

In an aspect, the blockchain data may be replicated or synchronized across the plurality of nodes such that each node maintains blockchain data corresponding to each autonomous system supported by embodiments of the present disclosure regardless of whether data corresponding to each autonomous system data is maintained on separate blockchains or a single blockchain. In such an implementation a single node may be responsible for performing control data verification processing for the autonomous system, such as the node that initially verified the control data, and different nodes may be responsible for performing control data verification for different autonomous systems. For example, the node performing control data verification for a particular autonomous system may be based on the location of the autonomous system relative to the plurality of nodes (e.g., the nearest node may issue control data), based on load balancing factors (e.g., a node serving few autonomous systems may be selected to provide control data processing functionality over a node serving many autonomous systems), based on a network connection characteristic (e.g., a node having a faster connection to the autonomous system may be selected to perform control data determinations), or based on other factors. Thus, while node-based control data verification may be performed by the plurality of nodes and data may be replicated and synchronized between the nodes, only one node may issue control data to a particular autonomous system (e.g., to avoid multiple nodes transmitting control data to the same autonomous system).

In an aspect, one or more autonomous systems supported by the blockchain-based techniques described herein may maintain a redundant, local fallback system, which may include similar components and functionality to the concepts described above and illustrated with reference to FIG. 2. For example, in FIG. 3, the fallback system node 312 is shown maintaining a blockchain 334. The fallback system node 312 may be configured to provide the functionality that is redundant to and performed in parallel with the functionality described with reference to the fault detection logic 118 and the blockchain 134 described above. The fallback system node 312 may provide failsafe monitoring of operations of the autonomous system 110 to ensure that appropriate failsafe measures are taken in the event that the fault detection logic 118 and the blockchain 134 experience a hardware malfunction or other error that may prevent the control data 224 of FIG. 2 from being provided. For example, the fallback system node 312 may perform analysis on the same types of data considered by the fault detection logic and may be configured to issue the same commands as would have been provided by the blockchain 134 but for a failure of the primary failsafe mechanisms (e.g., the fault detection logic 118 and the blockchain 134) suffering a failure.

In some aspects, rather than maintaining a fallback system locally, which may increase the cost of providing the functionality described herein, the fallback system node 312 may be provided by one of the nodes of the blockchain platform (e.g., one of the nodes 140, 160, 170 of FIG. 1). Such 'public nodes' can enable a high traffic road or area with many low cost autonomous vehicles to be deployed economically with safety such that, in the event that a failure of the smart contract or fault detection logic is detected, a request may be transmitted to a node of the blockchain platform that includes that data received by the fault detection logic 118 and the node may provide control data to the autonomous system based on analysis performed by the node.

As shown above, embodiments of the present disclosure provide various techniques for prevent accidents from occurring during operation of autonomous vehicles via parallel and redundant operations performed by the fallback system node 312, the control node 310 (or another node), and the fault detection logic 118/blockchain 134. Moreover, embodiments of the present disclosure provide parallel and distributed data processing, analysis, and validation techniques that may detect failures or faults in the autonomous navigation systems of autonomous systems, such as improper data being provided to AI/ML, algorithms (e.g., data representing a scenario the AI/ML algorithms are not trained to process correctly), sensor failures, or other conditions that may negatively impact the operational capabilities of an autonomous system, and execute failsafe actions to control operation of the autonomous system in a safe manner. Furthermore, the immutability of the blockchain technology utilized by embodiments of the present disclosure injects trustworthiness into the operations of autonomous systems. For example, data representative of the operational state of the autonomous system(s) may be recorded to the blockchain as an immutable record that is stored both locally and at one or more nodes of an external blockchain platform (e.g., the plurality of nodes 140, 160, 170 of FIG. 1). The immutable nature of the blocks of the blockchain ensures that data indicative of the operational state of the autonomous systems is not tampered with and can be trusted as providing an accurate view of the autonomous system's operating conditions. This allows root cause analysis to be better determined in case of local equipment destruction (e.g., from accidents) and may provide insights into aspects of the AWL algorithms for which additional training is necessary, which is difficult to determine using currently available techniques. Additionally, the smart contracts of the blockchain are also immutable and are automatically executed to provide control data configured to maintain the autonomous system in a safe operating state. Such capabilities and feature represent a technical improvement to challenges faced by existing control systems for autonomous systems and the technological shortcomings that such control systems currently suffer from (e.g., imperfect AI/ML algorithms and navigation logic).

An additional advantage provided by embodiments is the ability to synchronize data rapidly to other nodes of the blockchain platform, which provides system resilience and enables fault mitigation processing to be performing locally (e.g., including both normal and fallback verifications) or remotely (e.g., by a blockchain node operating in a control center or on the cloud). The parallel and distributed nature of the fault mitigation and failsafe action processing provided by embodiments can also execute an override if the need arises, such as if a failure occurs at the local and/or fallback processing stages. It is noted that the technical advantages described above have been provided for purposes of illustration, rather than by way of limitation and that other advantages and improvements to autonomous systems and their navigation systems may be recognized by a persons of skill in the art.

Figure 4:
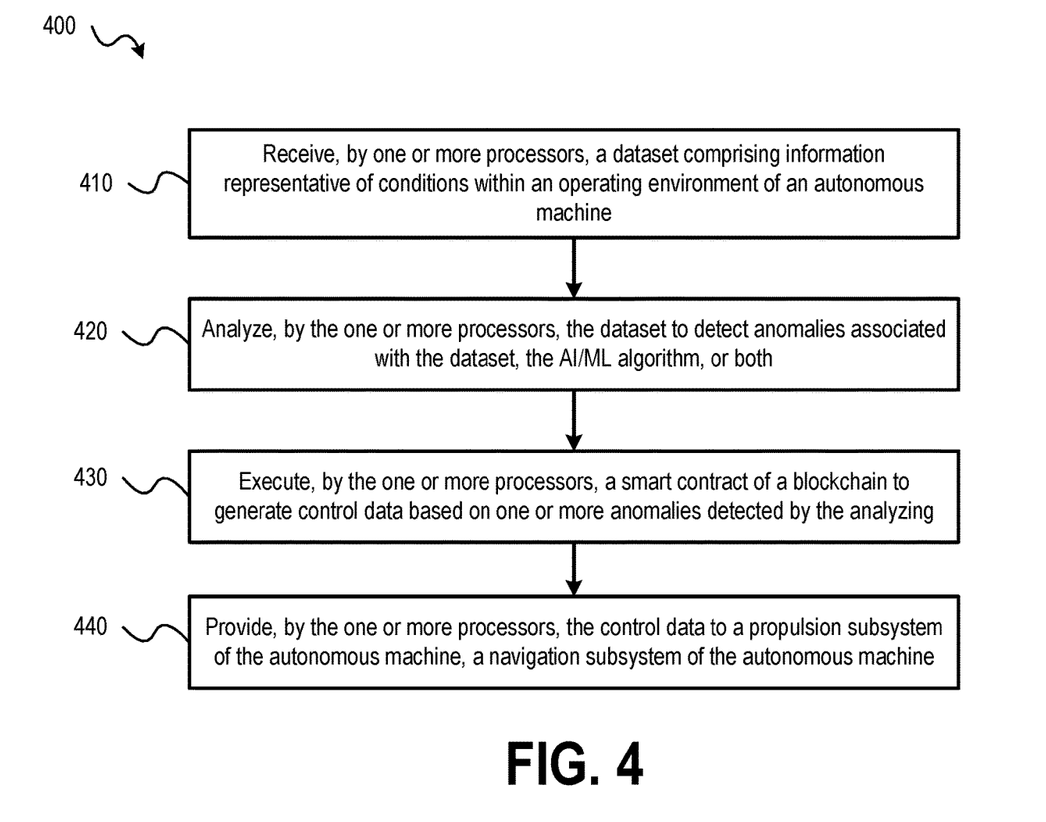
FIG. 4 is a flow diagram of method for leveraging blockchain technology to provide fault mitigation and failsafe action processing for autonomous systems in accordance with aspects of the present disclosure.

FIG. 4 is a flow diagram of method for leveraging blockchain technology to provide fault mitigation and failsafe action processing for autonomous systems in accordance with aspects of the present disclosure. In an aspect, the steps of the method 400 may be performed at an autonomous system, such as the autonomous system 110 of FIG. 1. The steps of the method 400 may be stored as instructions (e.g., the instructions 132 of FIG. 1) that, when executed by one or more processors (e.g., the one or more processors 112 of FIG. 1), cause the one or more processors to perform the steps of the method 400.

At step 410, the method 400 includes receiving, by one or more processors, a dataset comprising information representative of conditions within an operating environment of an autonomous system. The dataset may include at least first data corresponding to inputs to an AI/ML algorithm (e.g., the sensor data 202 of FIG. 2 and the processed data 204 of FIG. 2) and second data corresponding to an output of the AWL algorithm (e.g., the output data 206 of FIG. 2). As described above, the dataset may also include network data (e.g., the network data 208 of FIG. 2) and other data (e.g., the other data 210 of FIG. 2).

At step 420, the method 400 includes analyzing, by the one or more processors, the dataset to detect anomalies associated with the dataset, the AWL algorithm, or both. As described above with reference to FIG. 2, the analyzing may be performed using the various processes 230-240 described with reference to FIG. 2. At step 430, the method 400 may include executing, by the one or more processors, a smart contract of a blockchain to generate control data based on one or more anomalies detected by the analyzing. As described above with reference to FIG. 2, the control data may be configured to execute one or more failsafe actions configured to ensure the autonomous system is operated in a safe manner within a particular environment, which may include altering a speed of the autonomous system (e.g., to maintain the speed at a level that is consistent with the obstacle detection distance capabilities of the autonomous system, slow down the speed to provide sufficient reaction time to avoid a collision or impact, increase the speed to avoid a read or side impact collision, etc.), stopping the autonomous system (e.g., to avoid a potential collision), triggering of collision protection devices (e.g., airbags and sirens), playing a beep or other noise to alert a driver or other persons near the autonomous machine, changing a path or direction of travel of the autonomous system (e.g., to avoid an obstacle), stop supplying fuel to an engine, stop providing electrical power to one or more components of the autonomous machine. Where embodiments of the present disclosure are applied to chemical processing and manufacturing use cases, the actions may include removal of a supply of fuel, removal of a supply electricity, turning off of fuel supply/pumps, turning off of reagent supply/pumps, shutting down a drilling subsystem, shutting down one or more chemical reactors, triggering of fire alarms, triggering of sprinklers, initiating a call to emergency services personnel (e.g., a fire department, a police department, emergency medical services (EMS), etc.).

At step 440, the method 400 includes providing the control data to a propulsion subsystem of the autonomous system, a navigation subsystem of the autonomous system, or both. The control data may be the control data 224 of FIG. 2 and may override or take precedence over command data issued by the navigation subsystem. For example, where the autonomous system is an autonomous vehicle the navigation subsystem may determine a speed of travel that is too fast for the current conditions in which the autonomous system is operating (e.g., due to rain or other weather conditions that may negatively impact the distance at which obstacles may be detected) and the control data may slow the speed of the autonomous system. It is noted that controlling the speed of the autonomous system has been provided for purposes of illustration, rather than way of limitation and that control data of embodiments may include other failsafe actions as described herein. It is also noted that the method 400 may include additional operations described above with respect to FIGS. 1-3, such as fallback operations and the like.

Figure 5:
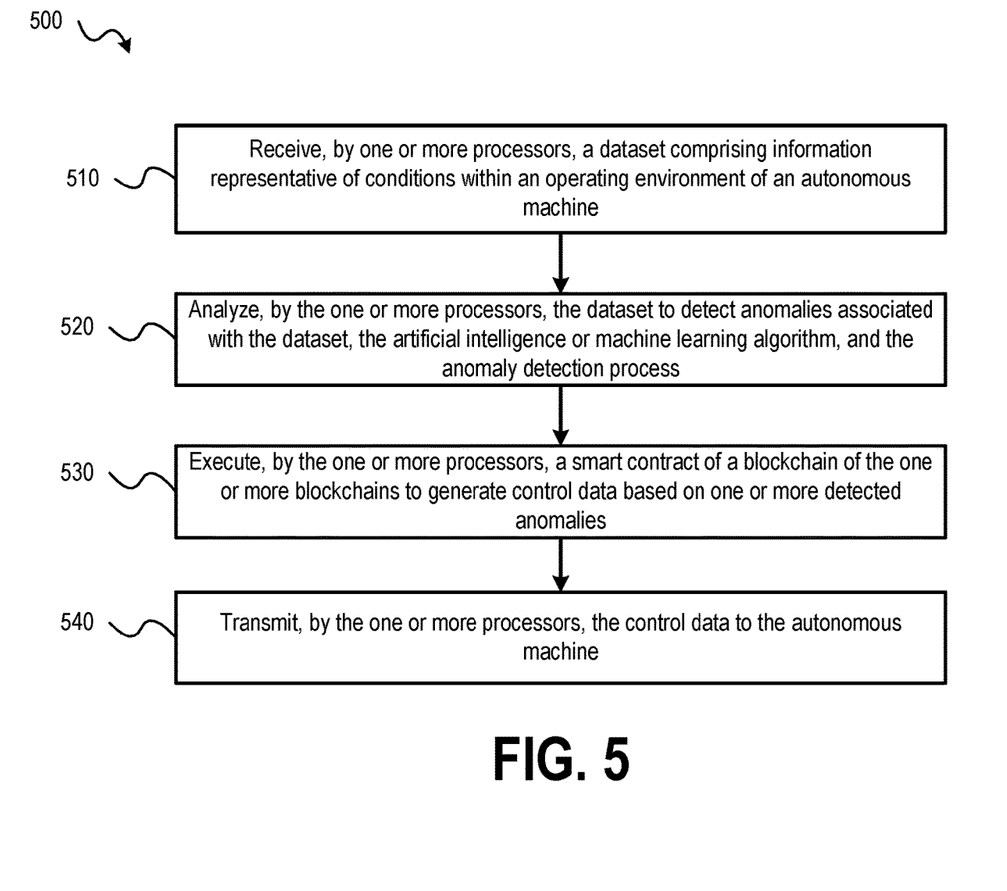
FIG. 5 is a flow diagram of another method for leveraging blockchain technology to provide fault mitigation and failsafe action processing for autonomous systems in accordance with aspects of the present disclosure.

Referring to FIG. 5, a flow diagram of another method for leveraging blockchain technology to provide fault mitigation and failsafe action processing for autonomous systems in accordance with aspects of the present disclosure. In an aspect, the steps of the method 500 may be performed at a node of a blockchain platform, such as one of the nodes 140, 160, 170 of FIG. 1. The node may store one or more blockchains, as described with reference to FIG. 3. The steps of the method 400 may be stored as instructions (e.g., the instructions 152 of FIG. 1) that, when executed by one or more processors (e.g., the one or more processors 142 of FIG. 1), cause the one or more processors to perform the steps of the method 500.

At step 510, the method 500 includes receiving, by one or more processors, a dataset comprising information representative of conditions within an operating environment of an autonomous system. The dataset may include at least first data corresponding to inputs to an AI/ML algorithm (e.g., the sensor data 202 of FIG. 2 and the processed data 204 of FIG. 2) and second data corresponding to an output of the AWL algorithm (e.g., the output data 206 of FIG. 2). As described above, the dataset may also include network data (e.g., the network data 208 of FIG. 2) and other data (e.g., the other data 210 of FIG. 2). The dataset may also include third data corresponding to an outcome of an anomaly detection process performed local to the autonomous system, such as an outcome determined by the fault detection logic 118 of FIGS. 1 and 2 and the smart contract(s) 220 of FIG. 2.

At step 520, the method 500 include analyzing the dataset to detect anomalies associated with the dataset, the artificial intelligence or machine learning algorithm, or the anomaly detection process. As described above with reference to FIG. 3, the node(s) of the blockchain platform may be configured to perform parallel and distributed processing to validate successful operation of local data analysis at autonomous systems. Such redundant processing may be performed as described with respect to the fault detection logic 118 and the smart contract 220 of FIG. 2.

At step 530, the method 500 include executing, by the one or more processors, a smart contract of a blockchain of the one or more blockchains to generate control data based on one or more detected anomalies. As described above with reference to FIG. 2, the control data may be configured to execute one or more failsafe actions configured to ensure the autonomous system is operated in a safe manner within a particular environment, which may include altering a speed of the autonomous system (e.g., to maintain the speed at a level that is consistent with the obstacle detection distance capabilities of the autonomous system), stopping the autonomous system (e.g., to avoid a potential collision), or changing a path or direction of travel of the autonomous system (e.g., to avoid an obstacle).

At step 540, the method 500 includes transmitting, by the one or more processors, the control data to the autonomous system. The control data may be configured to control operations of a propulsion subsystem of the autonomous system, a navigation subsystem of the autonomous system, or both. The control data may be similar to the control data 224 of FIG. 2 and may override or take precedence over command data issued by the navigation subsystem and any control data provided by local analysis. For example, where the autonomous system is an autonomous vehicle the navigation subsystem may determine a speed of travel that is too fast for the current conditions in which the autonomous system is operating (e.g., due to rain or other weather conditions that may negatively impact the distance at which obstacles may be detected) and the control data may slow the speed of the autonomous system. It is noted that controlling the speed of the autonomous system has been provided for purposes of illustration, rather than way of limitation and that control data of embodiments may include other failsafe actions as described herein. It is also noted that the method 400 may include additional operations described above with respect to FIGS. 1-3, such as fallback operations and the like.

It is noted that while the embodiments described above have been primarily described as being applied to autonomous systems, the present disclosure is not limited to such applications. For example, some vehicles are configured to provide autonomous navigation (e.g., autonomous driving) that may be user assisted, such that the user may take control over the vehicle at any point in time. In such cases, embodiments of the present disclosure may be utilized to provide failsafe notifications to a driver, such as to play a beep or other sound or provide another form of alert to the driver to allow the driver to take action to control the vehicle. Additionally, embodiments may monitor operation of the vehicle to ensure that appropriate actions are taken and may initiate failsafe actions to autonomously control the vehicle in the event that the driver does not take control or appropriately respond to the alerts, such as to slow or stop the vehicle if the driver does not do so.

In addition to applications of the disclosed embodiments to machines and vehicles, the above-described techniques may also be applied to other types of systems. For example, AWL algorithms are starting to be applied to the field of chemical manufacturing and petrochemical processing systems to control certain portions of those systems. The above-described fail safe monitoring and mitigation processes of embodiments may also be applied to these applications, as unexpected performance of the AI/ML algorithms utilized by such systems could potentially lead to accidents, deaths, and equipment and property loss on an even larger scale. When applied to such other systems, the corresponding sensors, actuator systems, and data utilized by the techniques disclosed herein may be adapted to the configurations of those systems. For example, instead of navigation and propulsion subsystems, the blockchain based fail safe monitoring and mitigation processes of embodiments may monitor chemical plant subsystems for reagent intake, monitoring, flowrate, and reactor parameter controls, and for petroleum extraction subsystems for drilling and pumping controls. Accordingly, it is to be understood that aspects of the present disclosure may be applied to many different types of AI/ML systems where the need to detect failures or shortcomings of the AWL algorithms may play a critical role in preventing damage to property, endangerment of lives, or other harmful outcomes that may be prevented by the disclosed embodiments.

Although the embodiments of the present disclosure and their advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the present disclosure, processes, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. A method comprising:
    receiving, by one or more processors, a dataset comprising information representative of conditions within an operating environment of an autonomous system, wherein the dataset includes at least first data corresponding to inputs to an artificial intelligence or machine learning algorithm and second data corresponding to an output of the artificial intelligence or machine learning algorithm;
    analyzing, by the one or more processors, the dataset to detect anomalies associated with the dataset, the artificial intelligence or machine learning algorithm, or both;
    executing, by the one or more processors, a smart contract of a blockchain to generate control data based on one or more anomalies detected by the analyzing;
    in response to detecting a failure associated with the execution of the smart contract, initiating, by the one or more processors, fallback processing of the dataset, wherein the fallback processing comprises:
        analyzing the dataset to detect the anomalies associated with the dataset, the artificial intelligence or machine learning algorithm, or both;
        executing a smart contract of a fallback blockchain to generate the control data based on one or more anomalies detected by the analyzing, wherein the fallback blockchain is separate from the blockchain; and
    providing the control data generated by the smart contract of the blockchain or the control data generated by the smart contract of the fallback blockchain to a propulsion subsystem of the autonomous system, a navigation subsystem of the autonomous system, or both, wherein the control data generated by the smart contract of the blockchain or the control data generated by the smart contract of the fallback blockchain is configured to control operation of the autonomous system;
    transmitting at least a portion of the dataset to a node of a blockchain platform, wherein the node of the blockchain platform is configured to perform parallel analysis of the dataset to detect anomalies associated with the dataset, the artificial intelligence or machine learning algorithm, or both;
    receiving second control data from the node, the second control data configured to override the control data generated by the smart contract of the blockchain or the control data generated by the smart contract of the fallback blockchain; and
    providing the second control data to the propulsion subsystem of the autonomous system, the navigation subsystem of the autonomous system, or both.

2. The method of claim 1, wherein the autonomous system is an autonomous vehicle, an autonomous robot, machinery, an autonomous plant, or construction site.

3. The method of claim 1, further comprising writing at least a portion of the dataset to a block of a blockchain.

4. The method of claim 1, wherein the first data comprises sensor data generated by one or more sensors of the autonomous system.

5. The method of claim 1, further comprising configuring information for processing by the artificial intelligence or machine learning algorithm, wherein the first data comprises the information configured for processing by the artificial intelligence or machine learning algorithm.

6. The method of claim 1, wherein the dataset comprises network data, and wherein the analyzing comprises detecting at least network congestion, network attacks, or both based on the network data.

7. The method of claim 1, wherein the dataset comprises location data, and wherein the analyzing comprises detecting inconsistencies with respect to distances to one or more obstacles proximate the autonomous system based on the location data and the second data.

8. The method of claim 1, wherein the control data comprises instructions to execute a failsafe action, the failsafe action comprising an action selected from the list consisting of: slowing a speed of the autonomous system, increasing a speed of the autonomous system, changing a direction of travel of the autonomous system, stopping the autonomous system, removal of fuel supply, removal of electricity supply, triggering of collision protection devices such as airbags and sirens, turning off of fuel supply/pumps, turning off of reagent supply/pumps, shutting down a drilling subsystem, shutting down one or more chemical reactors, triggering of fire alarms, and triggering of sprinklers.

9. A non-transitory computer-readable storage medium storing instructions that, when executed by one or more processors, cause the one or more processors to perform operations comprising:
   receiving a dataset comprising information representative of conditions within an operating environment of an autonomous system, wherein the dataset includes at least first data corresponding to inputs to an artificial intelligence or machine learning algorithm and second data corresponding to an output of the artificial intelligence or machine learning algorithm;
   analyzing the dataset to detect anomalies associated with the dataset, the artificial intelligence or machine learning algorithm, or both;
   executing a smart contract of a blockchain to generate control data based on one or more anomalies detected by the analyzing;
   in response to detecting a failure associated with the execution of the smart contract, initiating, by the one or more processors, fallback processing of the dataset, wherein the fallback processing comprises:
      analyzing the dataset to detect the anomalies associated with the dataset, the artificial intelligence or machine learning algorithm, or both;
      executing a smart contract of a fallback blockchain to generate the control data based on one or more anomalies detected by the analyzing, wherein the fallback blockchain is separate from the blockchain; and
   providing the control data generated by the smart contract of the blockchain or the control data generated by the smart contract of the fallback blockchain to a propulsion subsystem of the autonomous system, a navigation subsystem of the autonomous system, or both, wherein the control data generated by the smart contract of the blockchain or the control data generated by the smart contract of the fallback blockchain is configured to control operation of the autonomous system;
   transmitting at least a portion of the dataset to a node of a blockchain platform, wherein the node of the blockchain platform is configured to perform parallel analysis of the dataset to detect anomalies associated with the dataset, the artificial intelligence or machine learning algorithm, or both;
   receiving second control data from the node, the second control data configured to override the control data generated by the smart contract of the blockchain or the control data generated by the smart contract of the fallback blockchain; and
   providing the second control data to the propulsion subsystem of the autonomous system, the navigation subsystem of the autonomous system, or both.

10. The non-transitory computer-readable storage medium of claim 9, wherein the autonomous system is an autonomous vehicle or an autonomous robot.

11. The non-transitory computer-readable storage medium of claim 9, further comprising writing at least a portion of the dataset to a block of a blockchain.

12. The non-transitory computer-readable storage medium of claim 9, the operations further comprising configuring information for processing by the artificial intelligence or machine learning algorithm, wherein the first data comprises the information configured for processing by the artificial intelligence or machine learning algorithm and sensor data generated by one or more sensors of the autonomous system.

13. The non-transitory computer-readable storage medium of claim 9, wherein the dataset comprises network data, and wherein the analyzing comprises detecting at least network congestion, network attacks, or both based on the network data.

14. The non-transitory computer-readable storage medium of claim 9, wherein the dataset comprises location data, and wherein the analyzing comprises detecting inconsistencies with respect to distances to one or more obstacles proximate the autonomous system based on the location data and the second data.

15. The non-transitory computer-readable storage medium of claim 9, wherein the control data comprises instructions to execute a failsafe action, the failsafe action comprising an action selected from the list consisting of: slowing a speed of the autonomous system, increasing a speed of the autonomous system, changing a direction of travel of the autonomous system, stopping the autonomous system, removal of fuel supply, removal of electricity supply, triggering of collision protection devices such as airbags and sirens, turning off of fuel supply/pumps, turning off of reagent supply/pumps, shutting down a drilling subsystem, shutting down one or more chemical reactors, triggering of fire alarms, and triggering of sprinklers.

16. A system comprising:
   a node of a blockchain platform comprising a memory storing one or more blockchains and one or more processor communicatively coupled to the memory, wherein the one or more processors are configured to:
      receive a dataset comprising information representative of conditions within an operating environment of an autonomous system, wherein the dataset includes at least first data corresponding to inputs to an artificial intelligence or machine learning algorithm, second data corresponding to an output of the artificial intelligence or machine learning algorithm, and third data corresponding to an outcome of an anomaly detection process performed local to the autonomous system;

analyze the dataset to detect anomalies associated with the dataset, the artificial intelligence or machine learning algorithm, and the anomaly detection process;

execute a smart contract of a blockchain of the one or more blockchains to generate control data based on one or more detected anomalies;

in response to detecting a failure associated with the execution of the smart contract, initiating, by the one or more processors, fallback processing of the dataset, wherein the fallback processing comprises:

analyzing the dataset to detect the anomalies associated with the dataset, the artificial intelligence or machine learning algorithm, or both;

executing a smart contract of a fallback blockchain to generate the control data based on one or more anomalies detected by the analyzing, wherein the fallback blockchain is separate from the blockchain; and transmit the control data generated by the smart contract of the blockchain or the control data generated by the smart contract of the fallback blockchain to the autonomous system, wherein the control data generated by the smart contract of the blockchain or the control data generated by the smart contract of the fallback blockchain is configured to control operations of a propulsion subsystem of the autonomous system, a navigation subsystem of the autonomous system, or both;

transmitting at least a portion of the dataset to a second node of the blockchain platform, wherein the second node of the blockchain platform is configured to perform parallel analysis of the dataset to detect anomalies associated with the dataset, the artificial intelligence or machine learning algorithm, or both;

receiving second control data from the second node, the second control data configured to override the control data generated by the smart contract of the blockchain or the control data generated by the smart contract of the fallback blockchain; and providing the second control data to the propulsion subsystem of the autonomous system, the navigation subsystem of the autonomous system, or both.

17. The system of claim 16, wherein the one or more anomalies correspond to a fault associated with one or more sensors of the autonomous system, a defect in the artificial intelligence or machine learning algorithm, an error associated with the anomaly detection process, or a combination thereof.

18. The system of claim 16, wherein the control data comprises instructions to execute a failsafe action, the failsafe action comprising an action selected from the list consisting of: slowing a speed of the autonomous system, increasing a speed of the autonomous system, changing a direction of travel of the autonomous system, stopping the autonomous system, removal of fuel supply, removal of electricity supply, triggering of collision protection devices such as airbags and sirens, turning off of fuel supply/pumps, turning off of reagent supply/pumps, shutting down a drilling subsystem, shutting down one or more chemical reactors, triggering of fire alarms, and triggering of sprinklers.

19. The system of claim 16, wherein the one or more processors are configured to write at least a portion of the dataset to a block of the blockchain.

20. The system of claim 19, wherein the one or more processors are configured to synchronize at least the portion of the dataset written to the block of the blockchain with one or more other nodes of the blockchain platform.

21. The system of claim 16, wherein the first data comprises information configured for processing by the artificial intelligence or machine learning algorithm and sensor data generated by one or more sensors of the autonomous system.

22. The system of claim 16, wherein the dataset comprises network data, and wherein the one or more processors are configured to detect at least network congestion, network attacks, or both based on the network data.

23. The system of claim 16, wherein the dataset comprises location data, and wherein the one or more processors are configured to detect inconsistencies with respect to distances to one or more obstacles proximate the autonomous system based on the location data and the second data.

\* \* \* \* \*

UNITED STATES PATENT AND TRADEMARK OFFICE
CERTIFICATE OF CORRECTION

PATENT NO. : 11,531,330 B2
APPLICATION NO. : 16/986145
DATED : December 20, 2022
INVENTOR(S) : Ian Yuan Yuan Huang et al.

It is certified that error appears in the above-identified patent and that said Letters Patent is hereby corrected as shown below:

In the Specification
At Column 1, Line number 51, delete "AWL" and replace with --AI/ML--.
At Column 1, Line number 54, delete "AWL" and replace with --AI/ML--.
At Column 1, Line number 58, delete "AWL-based" and replace with --AI/ML based--.
At Column 2, Line number 13, delete "AWL" and replace with --AI/ML--.
At Column 2, Line number 39, delete "AWL" and replace with --AI/ML--.
At Column 2, Line number 50, delete "AWL" and replace with --AI/ML--.
At Column 5, Line number 36, delete "AWL" and replace with --AI/ML--.
At Column 5, Line number 43, delete "AWL" and replace with --AI/ML--.
At Column 6, Line number 7, delete "AWL" and replace with --AI/ML--.
At Column 7, Line number 51, delete "AWL" and replace with --AI/ML--.
At Column 8, Line number 11, delete "AWL" and replace with --AI/ML--.
At Column 8, Line number 14, delete "AWL" and replace with --AI/ML--.
At Column 9, Line number 30, delete "AWL" and replace with --AI/ML--.
At Column 9, Line number 32, delete "AWL" and replace with --AI/ML--.
At Column 9, Line number 34, delete "AWL" and replace with --AI/ML--.
At Column 9, Line number 48, delete "AWL" and replace with --AI/ML--.
At Column 9, Line number 52, delete "AWL" and replace with --AI/ML--.
At Column 10, Line number 57, delete "AWL" and replace with --AI/ML--.
At Column 11, Line number 11, delete "AWL" and replace with --AI/ML--.
At Column 11, Line number 22, delete "AWL" and replace with --AI/ML--.
At Column 13, Line number 3, delete "AWL" and replace with --AI/ML--.
At Column 13, Line number 30, delete "AWL" and replace with --AI/ML--.
At Column 14, Line number 48, delete "AWL" and replace with --AI/ML--.
At Column 18, Line number 35, delete "AWL" and replace with --AI/ML--.
At Column 19, Line number 13, delete "AWL" and replace with --AI/ML--.
At Column 19, Line number 19, delete "AWL" and replace with --AI/ML--.
At Column 20, Line number 25, delete "AWL" and replace with --AI/ML--.
At Column 21, Line number 34, delete "AWL" and replace with --AI/ML--.
At Column 21, Line number 54, delete "AWL" and replace with --AI/ML--.

Signed and Sealed this
Fourteenth Day of February, 2023

Katherine Kelly Vidal
*Director of the United States Patent and Trademark Office*